(12) United States Patent
Richardson et al.

(10) Patent No.: US 7,966,407 B2
(45) Date of Patent: Jun. 21, 2011

(54) NETWORK DEVICE AND INTERCEPTOR MODULE SYSTEM AND METHOD FOR CONTROLLING REMOTE COMMUNICATIONS

(75) Inventors: John H Richardson, Wilkes-Barre, PA (US); Carl J Witkowski, Duryea, PA (US)

(73) Assignee: Guard Insurance Group, Wilkes-Barre, PA (US)

( * ) Notice: Subject to any disclaimer, the term of this patent is extended or adjusted under 35 U.S.C. 154(b) by 103 days.

(21) Appl. No.: 12/551,002

(22) Filed: Aug. 31, 2009

(65) Prior Publication Data

US 2010/0049854 A1    Feb. 25, 2010

Related U.S. Application Data

(63) Continuation of application No. 12/255,319, filed on Oct. 21, 2008, now Pat. No. 7,590,744, which is a continuation-in-part of application No. 10/905,102, filed on Dec. 15, 2004, now abandoned.

(51) Int. Cl.
G06F 15/16 (2006.01)
G06F 12/00 (2006.01)

(52) U.S. Cl. ........................................ 709/227; 709/232

(58) Field of Classification Search .................. 709/227, 709/232, 217–219, 203, 228–229, 250
See application file for complete search history.

(56) References Cited

U.S. PATENT DOCUMENTS

| | | | |
|---|---|---|---|
| 4,318,182 A | 3/1982 | Bachman et al. | |
| 4,320,451 A | 3/1982 | Bachman et al. | |
| 4,445,171 A | 4/1984 | Neches | |
| 5,634,038 A | 5/1997 | Saitoh | |
| 5,727,155 A | 3/1998 | Dawson | |
| 5,754,800 A | 5/1998 | Lentz et al. | |
| 6,003,069 A | 12/1999 | Cavill | |
| 6,154,839 A | 11/2000 | Arrow et al. | |
| 6,249,294 B1 | 6/2001 | Lefebvre et al. | |
| 6,341,272 B1 | 1/2002 | Randle | |
| 6,385,636 B1 | 5/2002 | Suzuki | |
| 6,532,487 B1 | 3/2003 | Perks | |
| 6,625,641 B1 | 9/2003 | Hare et al. | |
| 6,795,851 B1 * | 9/2004 | Noy | 709/218 |
| 6,920,502 B2 | 7/2005 | Araujo et al. | |
| 7,043,534 B1 | 5/2006 | Donnelly et al. | |

(Continued)

FOREIGN PATENT DOCUMENTS

JP    9-204383    8/1997

(Continued)

*Primary Examiner* — Zarni Maung
(74) *Attorney, Agent, or Firm* — IP Authority, LLC; Ramraj Soundararajan

(57) ABSTRACT

A remote communication system and method are disclosed. An environment in an electronic device, such as a computer based device, is identified defining a plurality of parameters communicated between the electronic device and a remote computer as part of a remote session (i.e., the electronic device remotely controlling the remote computer via the remote session), with each parameter defining an action associated with the remote session. A first application, via a unidirectional communication with the environment, modifies at least one parameter associated with the environment (e.g., modifying keyboard scan codes, cursor position, mouse position, clipboard data, screen resolution, or channel administration). A network device (e.g., a router, a switch, a hub, a repeater, a multilayer switch, etc.) monitors communication between the electronic device and the remote computer and extracts the modified parameter and, based on a look-up, executes a pre-defined action affecting the remote session, wherein the pre-defined action is different than the modified parameter's associated action.

21 Claims, 18 Drawing Sheets

U.S. PATENT DOCUMENTS

| | | | |
|---|---|---|---|
| 7,509,389 B1 * | 3/2009 | Duffield et al. | 709/209 |
| 2001/0047406 A1 | 11/2001 | Araujo et al. | |
| 2002/0048054 A1 | 4/2002 | Ohata et al. | |
| 2002/0087729 A1 | 7/2002 | Edgar | |
| 2003/0041147 A1 * | 2/2003 | van den Oord et al. | 709/227 |
| 2003/0105813 A1 | 6/2003 | Mizutani | |
| 2005/0091057 A1 * | 4/2005 | Phillips et al. | 704/270.1 |
| 2005/0152319 A1 * | 7/2005 | Kubler et al. | 370/338 |
| 2006/0146837 A1 * | 7/2006 | Atsuki et al. | 370/400 |

FOREIGN PATENT DOCUMENTS

| | | |
|---|---|---|
| JP | 2001-265880 | 9/2001 |
| JP | 2003-30383 | 1/2003 |
| JP | 2003-39767 | 2/2003 |

* cited by examiner

NETWORK DEVICE AND INTERCEPTOR MODULE SYSTEM AND METHOD FOR CONTROLLING REMOTE COMMUNICATIONS

RELATED APPLICATIONS

This application is a Continuation of U.S. application Ser. No. 12/255,319, filed Oct. 21, 2008, pending, which is a Continuation-In-Part of U.S. application Ser. No. 10/905,102, filed Dec. 15, 2004, now abandoned.

BACKGROUND OF THE INVENTION

1. Field of Invention

The present invention relates generally to the field of remote processing and remote access solutions. More specifically, the present invention is related to a remote communication system and method using a network device (e.g., a router, a switch, a hub, a repeater, a multilayer switch, etc.) including an interceptor module.

2. Discussion of Prior Art

There are a myriad of prior art remote access solutions available such as Symantec's PCAnywhere™ and GoToMyPC™ wherein users utilize specific remote access software to gain access to remote servers or PC's. FIGS. 1a-b illustrate two such prior art remote access schemes. In a first scheme, depicted in FIG. 1a, users (such as user 102) interested in gaining remote access to a remote server 110 first install server-specific remote access software (such as a java script 104 or ActiveX component 106) on his/her personal computer (PC) 108. Next, using the installed server-specific remote access software, users access the remotely located server 110 over network 112 (e.g., local area network (LAN), wide area network (WAN), the Internet, etc.).

In a second scenario, depicted in FIG. 1b, users (such as user 114) who wish to remotely access their PC 116 install specific remote access software (such as java script 118 or ActiveX component 120) on the PC 116 that is to be remotely accessed. Next, user 114, or someone who is authorized to access PC 116 (such as a system administrator), is able to remotely access PC 116 over network 128 (e.g., local area network (LAN), wide area network (WAN), the Internet, etc.) after installing specific remote access software (such as a java script 122 or ActiveX component 124) via PC 126.

For example, users who are interested in remotely accessing their office PC 116 from a remote location install software such as Symantec's PCAnywhere™ software on their office PC 116. Next, users have to install a corresponding version of Symantec's PCAnywhere software in computer 126 from a remote location prior to being able to access the remotely located office PC (which should also be running the remote access software at the time access is requested).

A common aspect of prior art remote access solutions, such as the one depicted in FIGS. 1a and 1b, is the necessity to install specific remote access software in a client PC prior to establishing communication with a remote server or remote PC, which also requires the pre-installation of remote access software.

The following patents provide general background regarding client/server interactions, but fail to overcome many of the limitations provided by the present invention.

The patent to Cavil (U.S. Pat. No. 6,003,069) provides for a client/server printer driver system. Cavil discloses a client terminal capable of submitting a job to a server, which processes the request and sends processed data to the client terminal. Additionally disclosed is a subsystem allowing a client terminal to send a portion of data to one or more servers and/or process a portion of data on the disclosed client itself. The disclosed subsystem is comprised of facilities to combine processed data from each of the different destinations to which the disclosed client terminal sent process requests.

The patent to Hare et al. (U.S. Pat. No. 6,625,641) provides for a method and apparatus for providing client support without installation of server software. Hare et al. disclose a client process executing on a local machine, having access to server software physically stored on a remote machine. When a client process has a request, a remote server software entry is located in a mount table entry. Once contact is made between a client and remote host, object services are provided to the disclosed client process. Also disclosed is a method of allowing a client process to locate an active server process at a remote host machine by utilizing the disclosed mount table entry. Processes are located and contacted on a remote host without user intervention.

The patent application publication to Mizutani (2003/0105813 A1) discloses a system and method for allowing client application processing requests to be processed on a server. A client-side I/O device is initialized based on information received from a server. The disclosed I/O device receives output information provided by the application-processing unit of the disclosed server in response to processing input information received from a client.

The Japanese patent to Asada (JP 9-204383) discloses a method of selecting and connecting to a server terminal with a light load. As a result of the disclosed selection process, applications executed on the server execute faster.

The Japanese patent to Wada et al. (JP 2003-30383) discloses a method connecting a client terminal to a data center storing requested rental software. The disclosed data center is also comprised of a form generation database allowing for client input. See abstract.

Whatever the precise merits, features, and advantages of the above cited references, none of them achieves or fulfills the purposes of the present invention.

SUMMARY OF THE INVENTION

The present invention, in one embodiment, provides for a method as implemented in a router or switch comprising: (a) extracting a modified parameter associated with an environment of an electronic device, the electronic device remotely controlling, via a second application, a remote session on a remote computer over a first network, the remote controlling performed via a bidirectional communication, and the environment defining a plurality of parameters communicated between the electronic device and remote computer as part of the remote session, each parameter in the plurality of parameters defining an action associated with the remote session, wherein the modified parameter is modified by a first application running in the electronic device, via a unidirectional communication with the environment; (b) looking up a pre-defined action corresponding to the extracted modified parameter; and (c) executing the pre-defined action to affect the remote session, the pre-defined action different than the modified parameter's associated action.

The present invention also provides for a method as implemented in a network device comprising: (a) the network device extracting a modified parameter associated with an environment of an electronic device, the electronic device remotely controlling, via a second application, a remote session on a remote computer over a first network, the remote controlling performed via a bidirectional communication, and the environment defining a plurality of parameters communicated between the electronic device and remote computer as part of the remote session, each parameter in the plurality of parameters defining an action associated with said remote session, wherein the modified parameter is modified by a first application running in the electronic device, via a unidirectional communication with the environment; (b) the network device looking up a pre-defined action corresponding to the extracted modified parameter; and (c) the network device executing the pre-defined action to affect the remote session, the pre-defined action different than the modified parameter's associated action, wherein the network device is any of the following: a router, a switch, a hub, a repeater, a network interface card, or a multilayer switch.

The present invention also provides for an article of manufacture having computer readable program code implementing the above-described methods in a network device (e.g., a router, a switch, a hub, a repeater, a network interface card, or a multilayer switch).

BRIEF DESCRIPTION OF THE DRAWINGS

FIGS. 5 through 15 illustrate various screenshots of one implementation of the present invention's system and method for remote access to applications implemented in object servers.

DESCRIPTION OF THE PREFERRED EMBODIMENTS

Figure 1A:
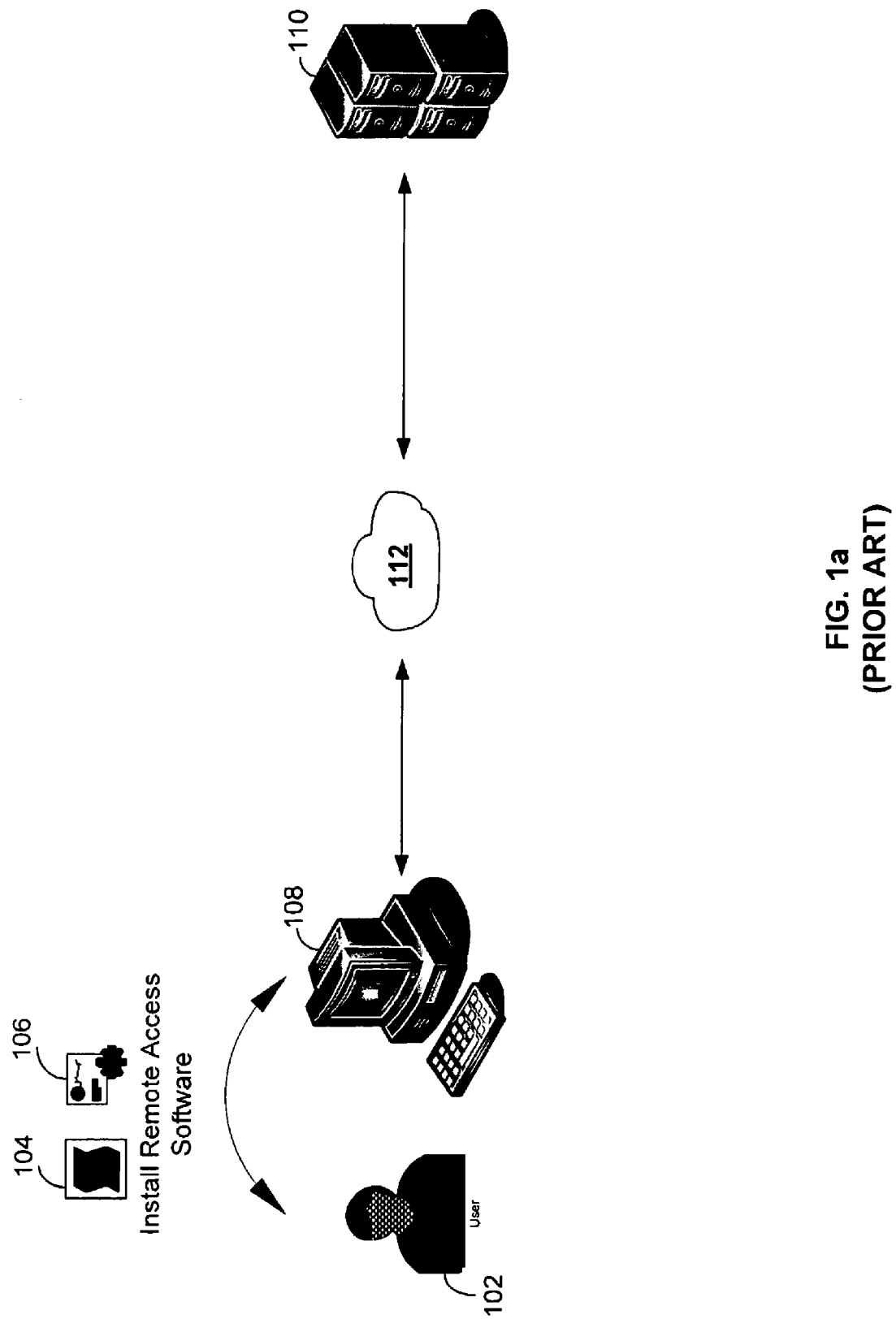
FIGS. 1a and 1b illustrate two prior art remote access schemes.
Figure 1B:
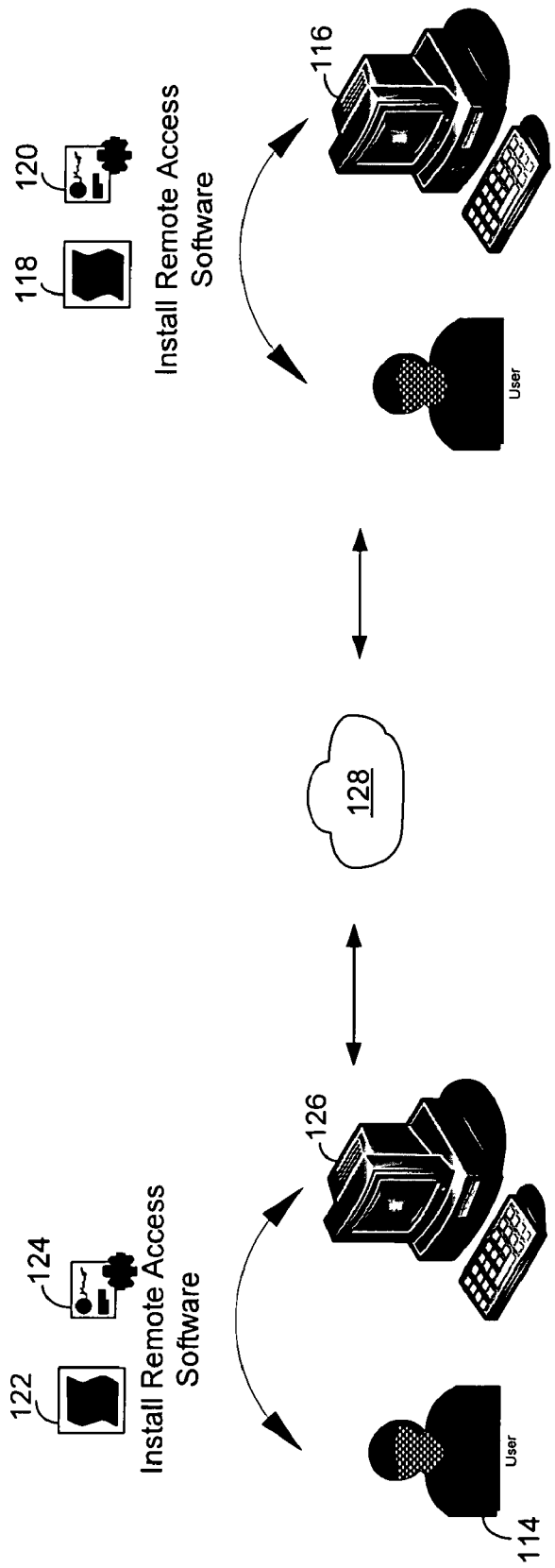

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
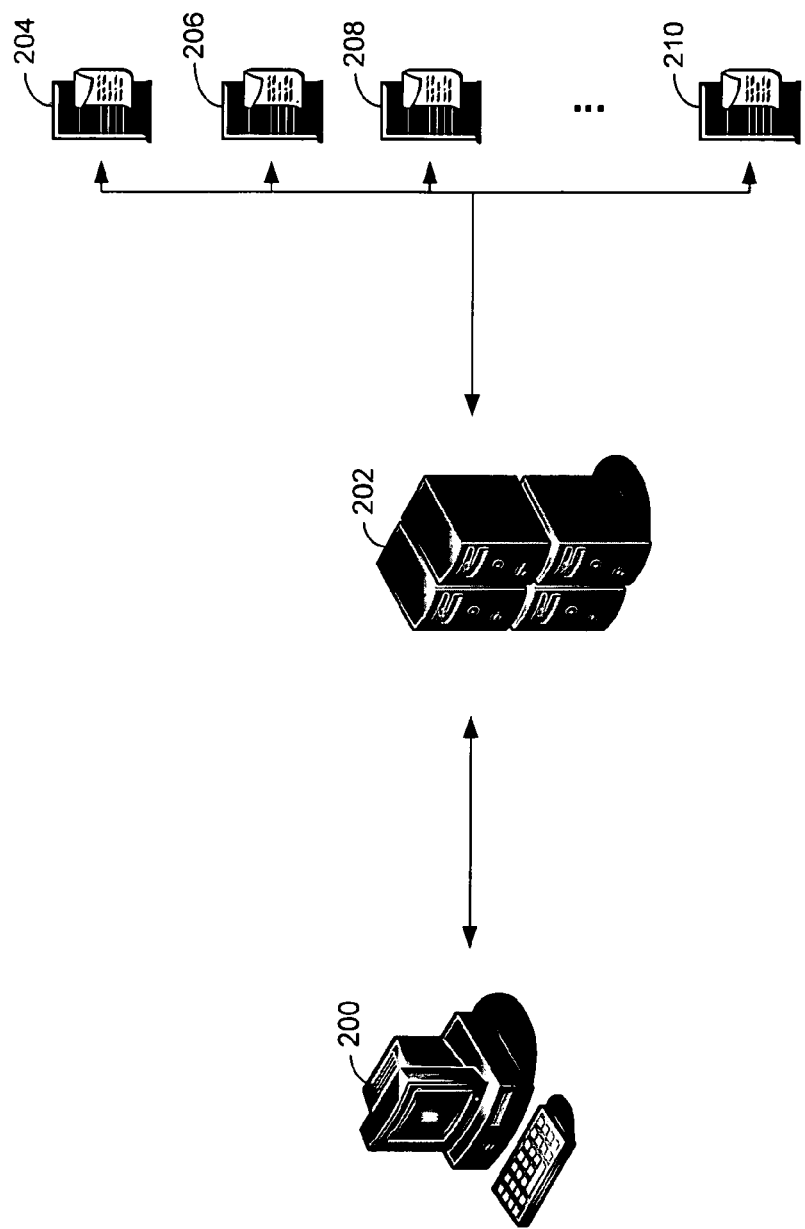
FIG. 2 illustrates an exemplary embodiment of the communication system of the present invention.

The present invention provides for a method and system for remote communication. FIG. 2 illustrates an exemplary embodiment of the communication system of the present invention. The present invention's communication system provides access to remotely controllable applications, wherein the system comprises a session server 202 and one or more object servers 204, 206, 208, and 210. Each object server is associated with at least one remotely controllable application, wherein processing associated with the remotely controllable application affected by reflected modifications in one or more client environment(s) (such as client environment(s) associated with client 200). Session server 202 stores one or more software modules, wherein each software module is capable of monitoring modifications to at least one client environment (such as client environment(s) associated with client 200) and communicating with at least one object server (204, 206, 208, or 210) to reflect such modifications. Session server 202 establishes a communication session with one or more clients (such as client 200), identifies at least one remotely controllable application associated with the communication session, loads a software module corresponding to identified remotely controllable application to communicate with corresponding object server (204, 206, 208, or 210), monitors modifications to client environment via the loaded software module, and reflects modifications in said client environment to said corresponding object server.

It should be noted that session server 202 and object server 204, 206, 208, or 210 does not have to be in the same premises, nor, the same segment of a network. They can be on a separate LAN, VAN, or WAN. Hence, the specific locations of the session server and the object servers should not be used to restrict the scope of the present invention.

Figure 3:
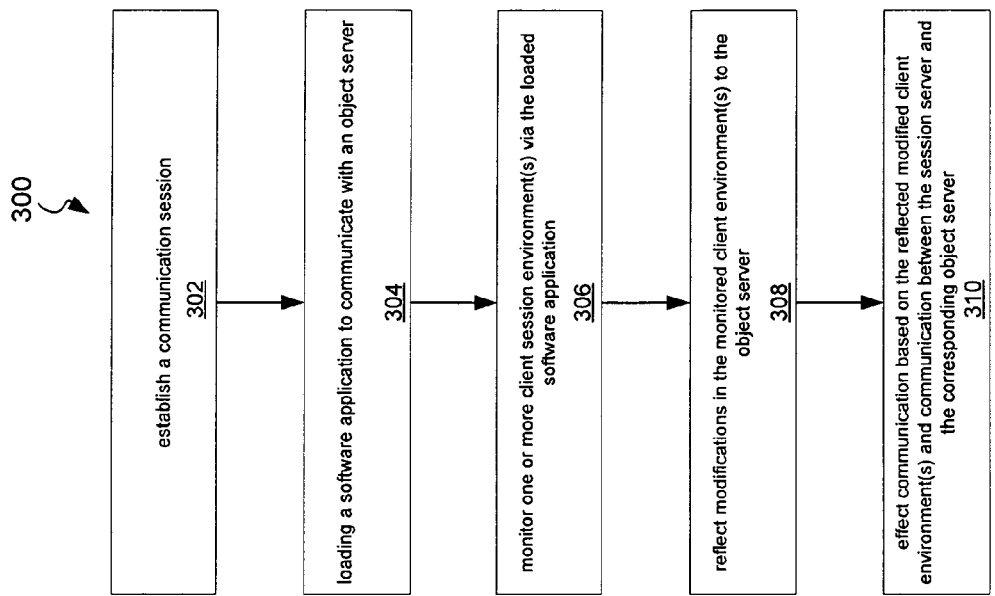
FIG. 3 illustrates an exemplary method of the present invention

FIG. 3 illustrates exemplary method 300 of the present invention. In step 302, a communication session is established between a session server and a client. As one example, the communication session is established as a virtual private network (VPN) session. In the preferred embodiment, the client is a web browser (e.g., Internet Explorer™, Netscape™Mozilla™, etc.) and the session server is a terminal server. Also, in one embodiment, communication between the client and the session server is performed via the Remote Desktop Protocol™ (RDP). It should be noted that communication between the client and the session server is over any of, or a combination of, the following networks: a local area network (LAN), a wide area network (WAN), or the Internet.

In step 304, the session server loads at least one software application among a plurality of software applications to communicate with at least one object server. Next, in step 306, the loaded software application monitors one or more client environment(s) to detect any changes in the client environment(s). In step 308, the loaded software application reflects modified client environment(s) to the corresponding object server, wherein processing associated with the communication session is effected, in step 310, based on the reflected modified client environment(s) and communication between the session server and corresponding object server.

In the preferred embodiment, the client environment(s) is reflected using one or more semaphore flags. In one embodiment, a plurality of semaphore flags is used, wherein each flag is represented via a 16-bit masked constant that triggers a corresponding action. For example, a semaphore flag could be represented by the 16-bit value—00000000:00000001, which corresponds to the action command—OPEN. Similarly, another semaphore flag could be represented by the 16-bit value—00000000:00000010, which corresponds to the action command—CLOSE.

Figure 4:
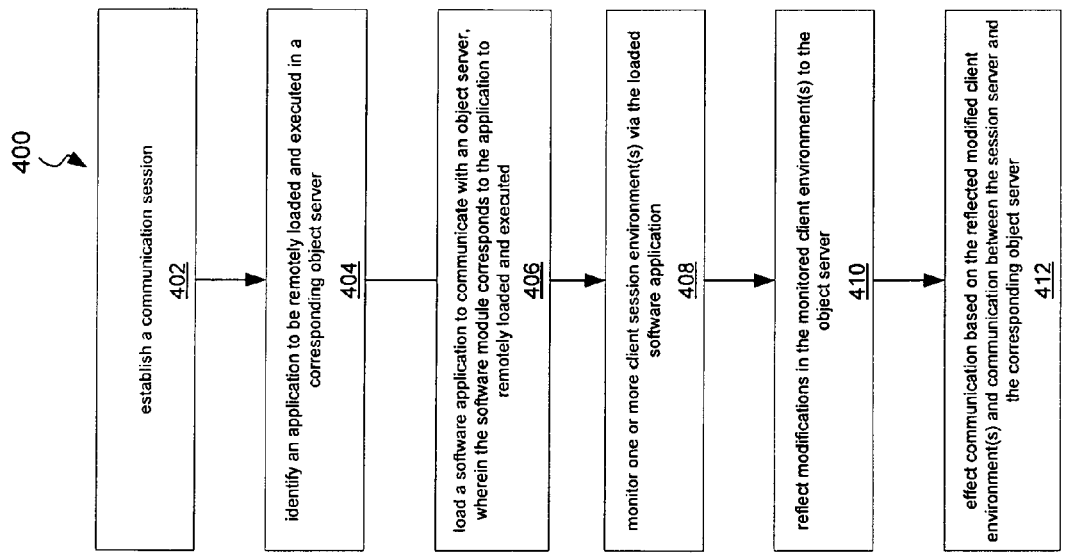
FIG. 4 illustrates another embodiment of the present invention's communication method implemented in a session server for remote access to applications implemented in object servers, wherein each object server implements at least one application

FIG. 4 illustrates another embodiment of the present invention's communication method 400 implemented in a session server for remote access to applications implemented in object servers, wherein each object server implements at least one application. In step 402, the session server establishes a communication session (e.g., a VPN session) with a client (e.g., a web browser such as Internet Explorer™, Netscape™, Mozilla™, etc.). In step 404, the session server identifies at least one application to be remotely loaded and executed in a corresponding object server and, in step 406, the session server loads an appropriate software module to communicate with corresponding object server, wherein the software module corresponds to at least one application to be remotely loaded and executed.

Next, in step 408, the session server monitors modifications to at least one client environment via the loaded software module and, in step 410, the session server reflects modifications in the client environment(s) to the corresponding object server. In step 412, processing associated with the communication session is effected based on reflected modifications in the client environment and communication between the session server and the corresponding object server.

In the preferred embodiment, the client environment(s) is reflected using one or more semaphore flags.

Figure 5:
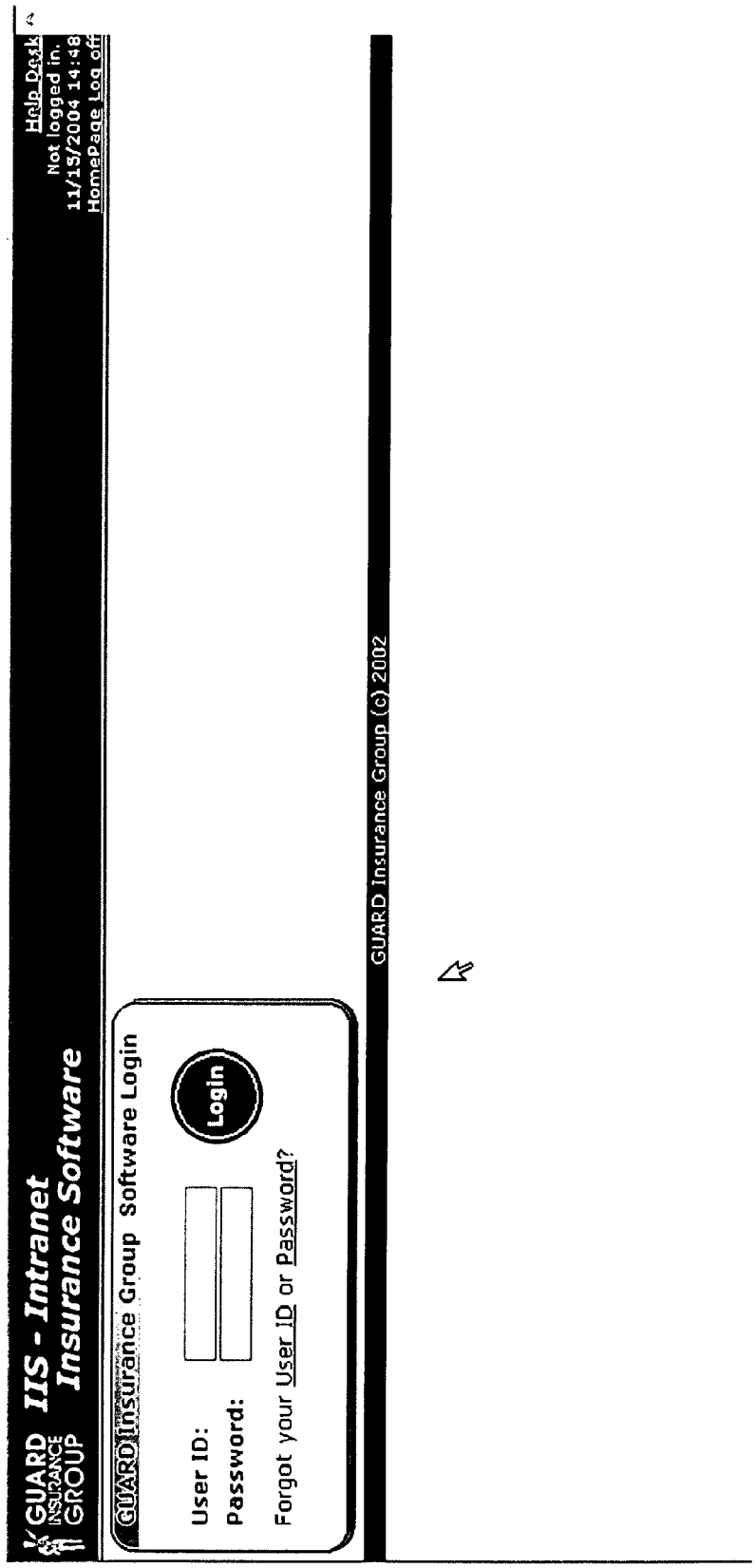
Figure 6:
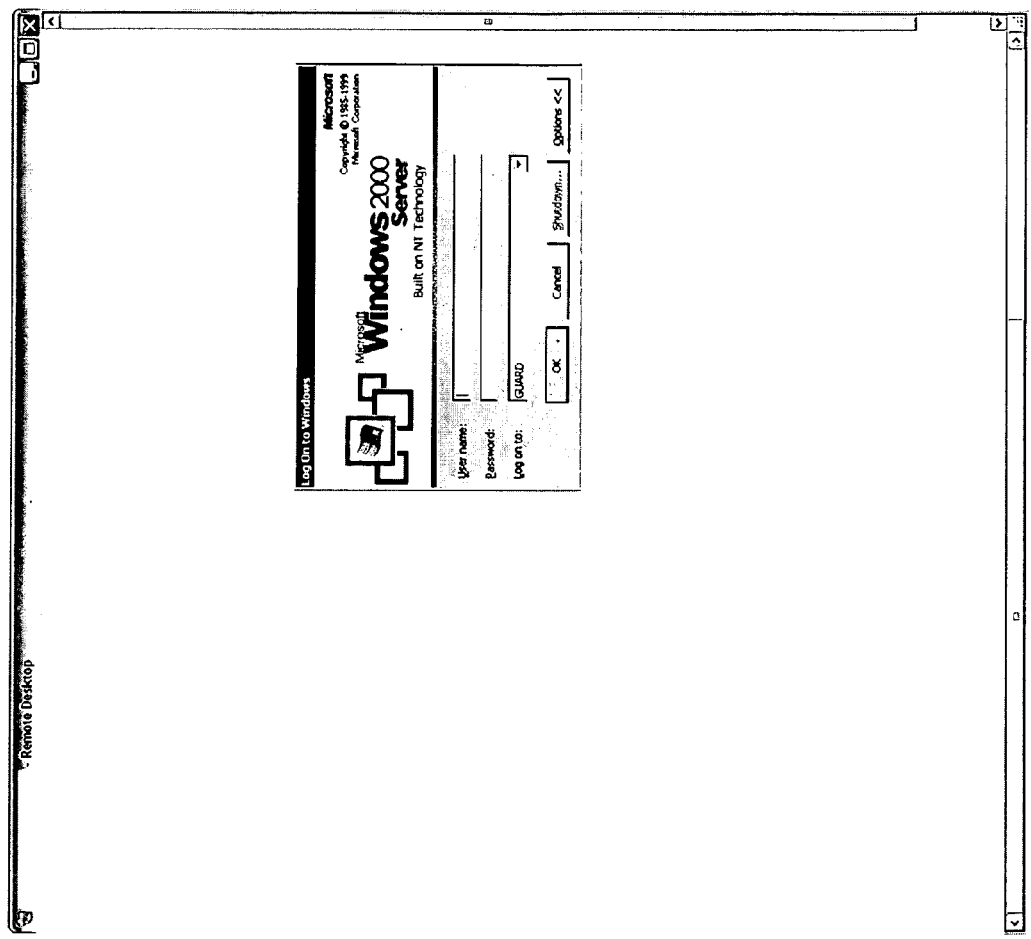
Figure 7:
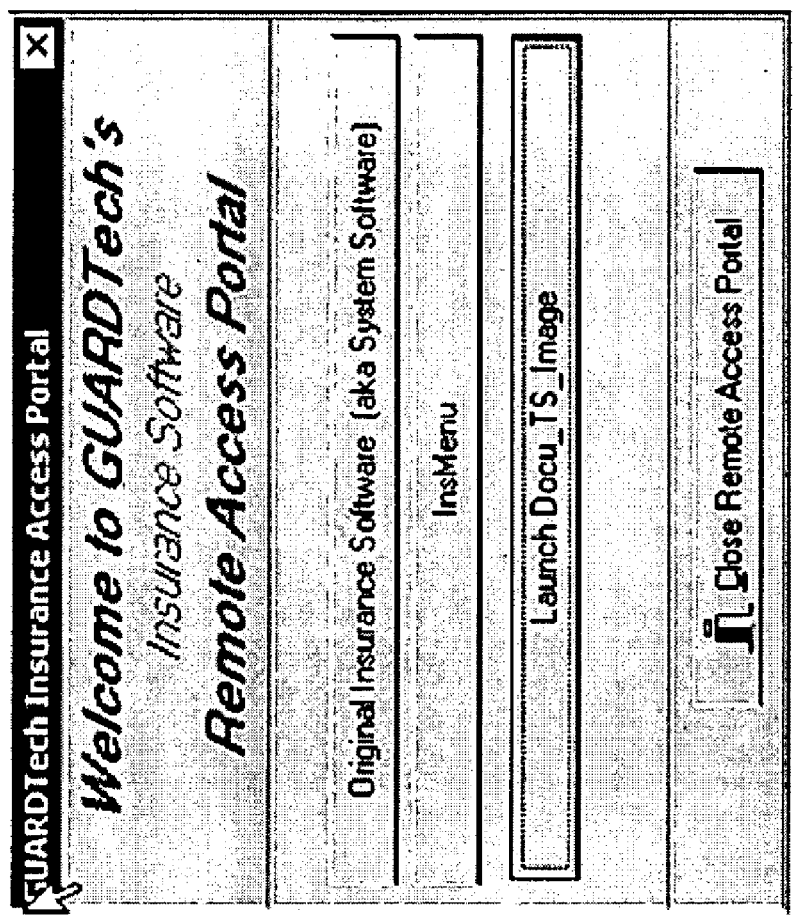

FIGS. 5-15 illustrate various screenshots of one implementation of the present invention's system and method for remote access to applications implemented in object servers. First, an authorized user establishes a virtual private network (VPN) session with a session server. Next, as shown in FIG. 5, an initial login screen is presented to the user via a client (such as a browser). An authorized user then logs into his/her account using the login page. Similarly, an authorized user opens a remote desktop connection via logging into the session server via a login screen shown in FIG. 6. After, logging into the session server, an access portal application is rendered to the user as shown in FIG. 7. The user then clicks on a choice (for example, a user can click on the choice—"Launch Docu_TS_Image") to launch the appropriate application in the session server.

Figure 8:
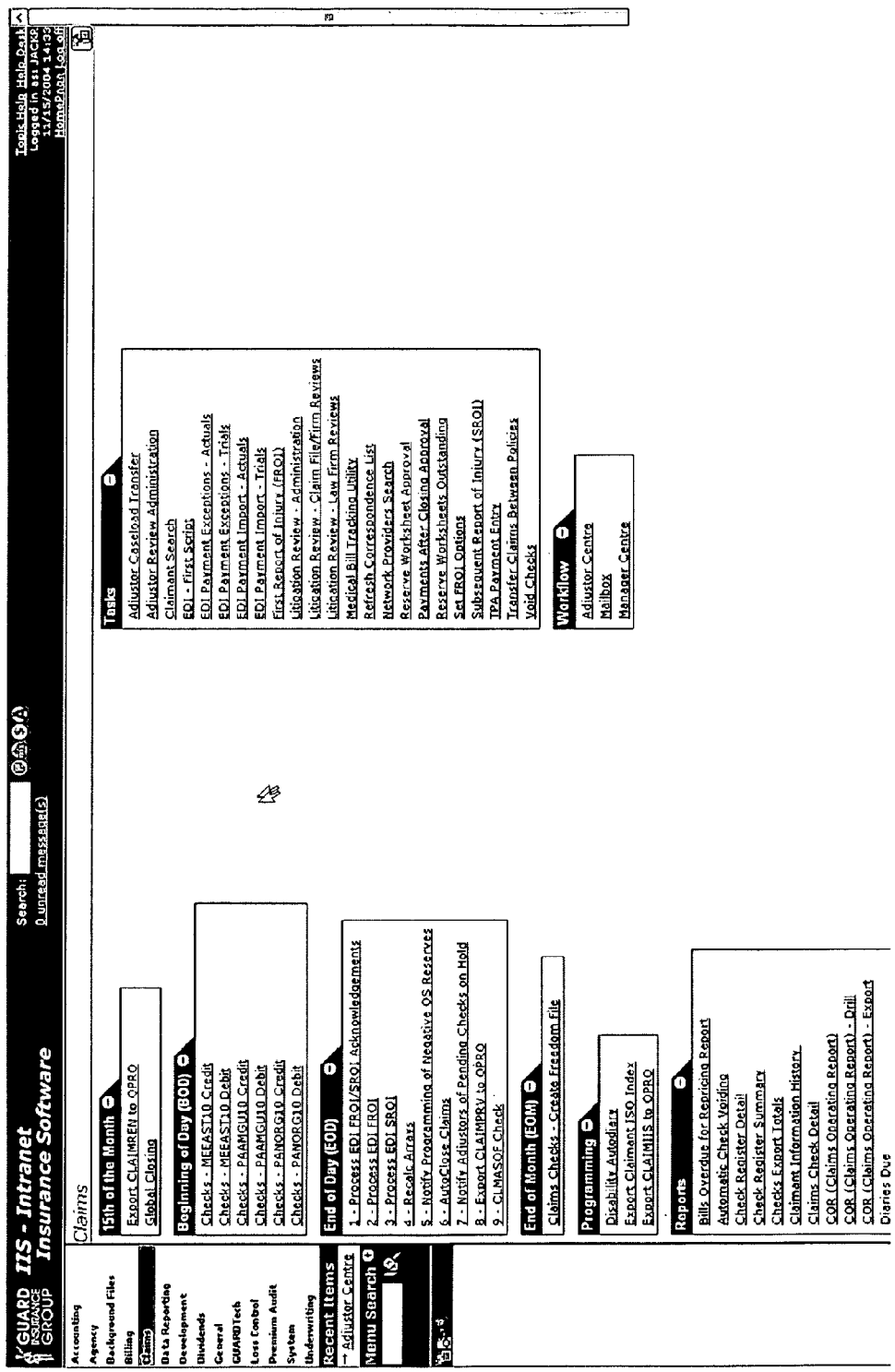
Figure 9:
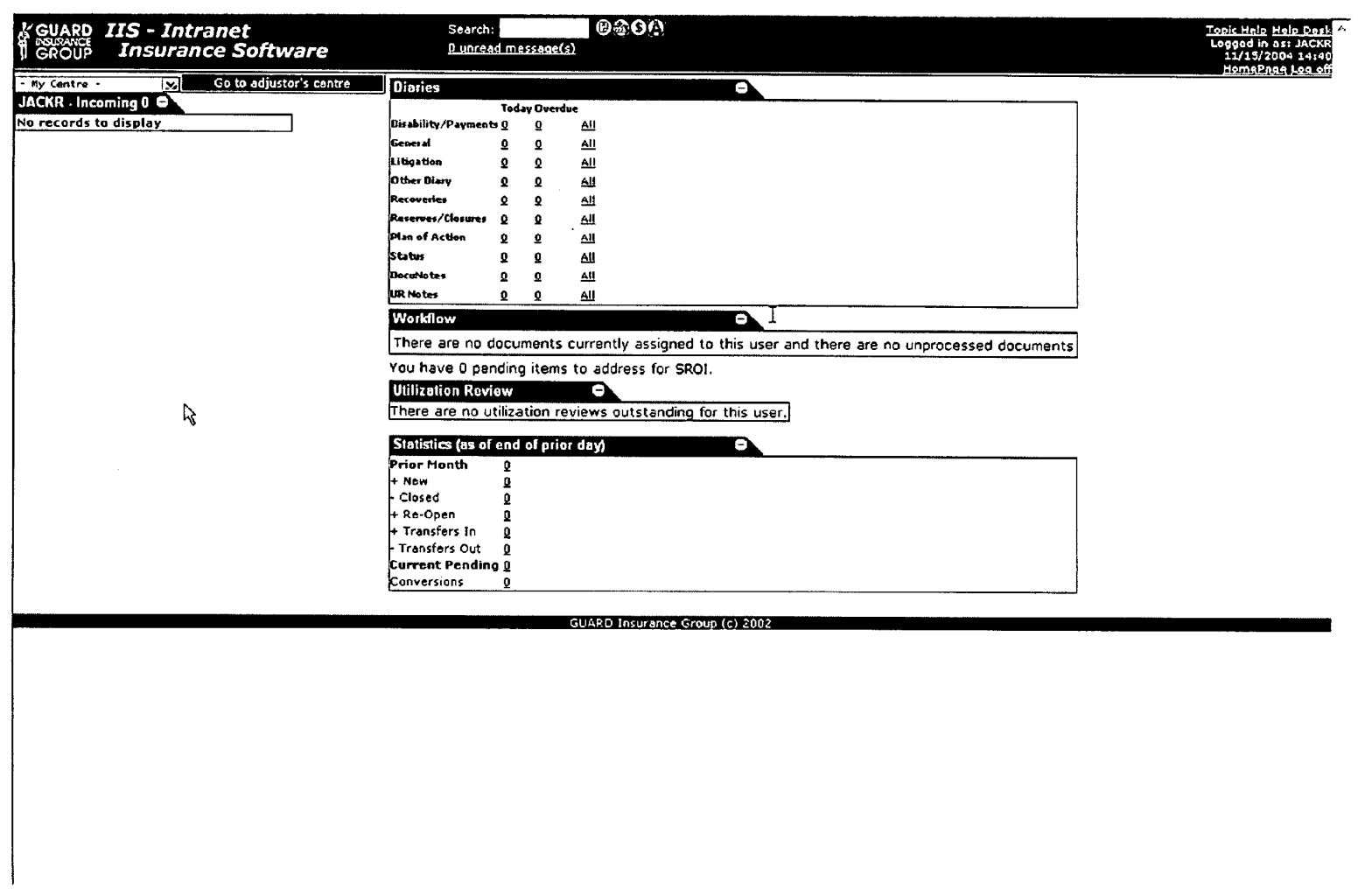
Figure 10:
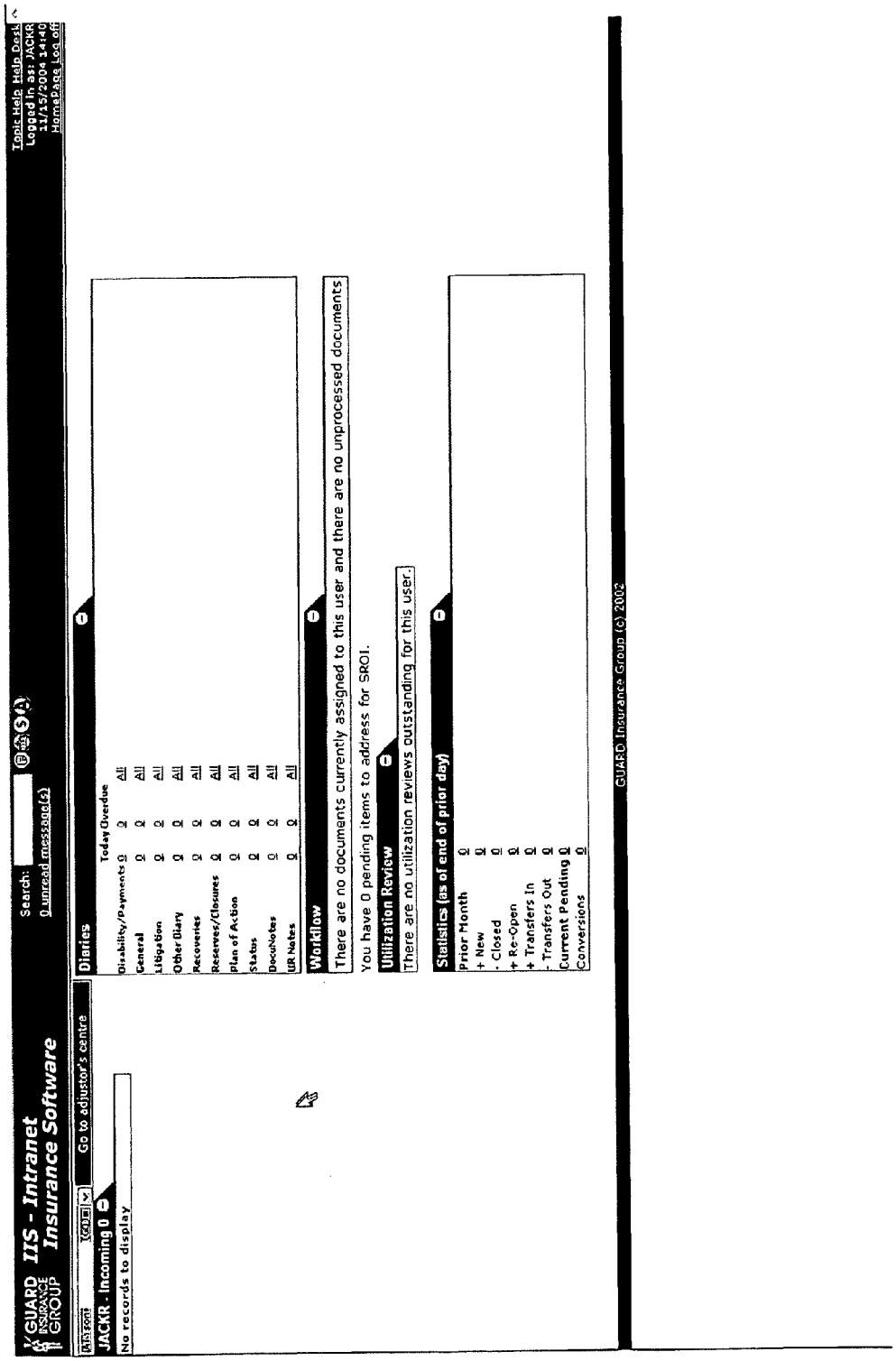
Figure 11:
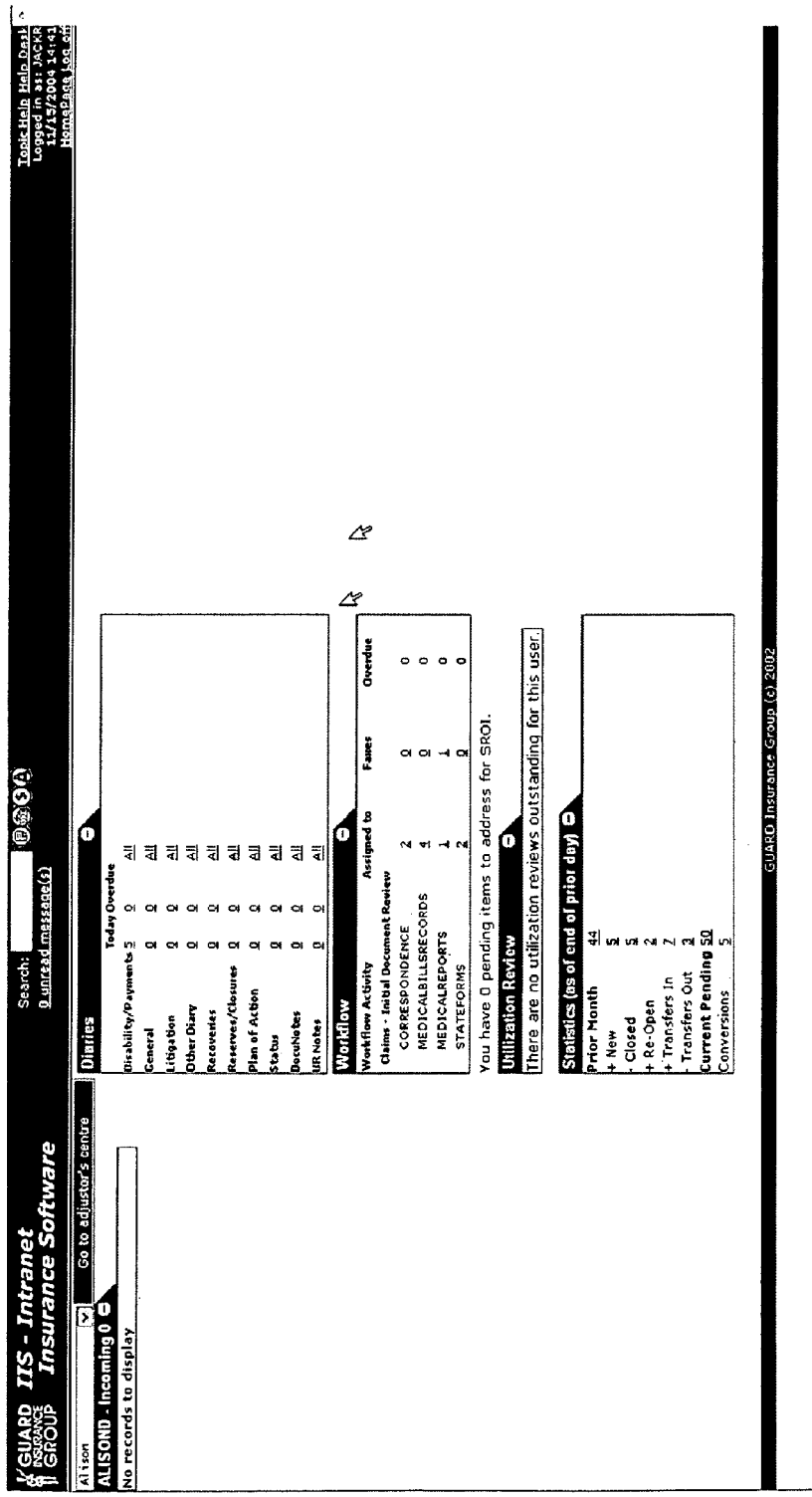
Figure 12:
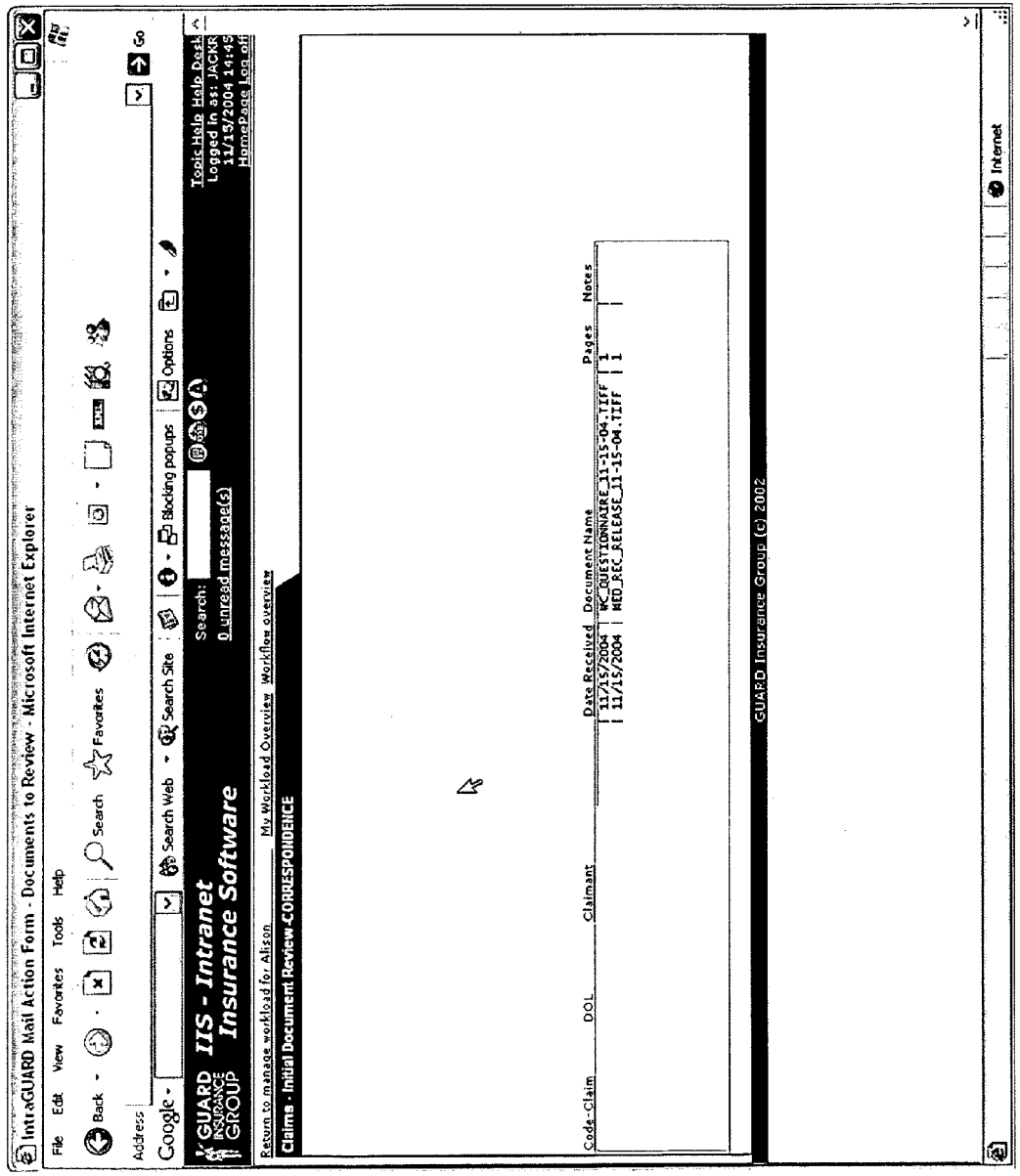
Figure 13:
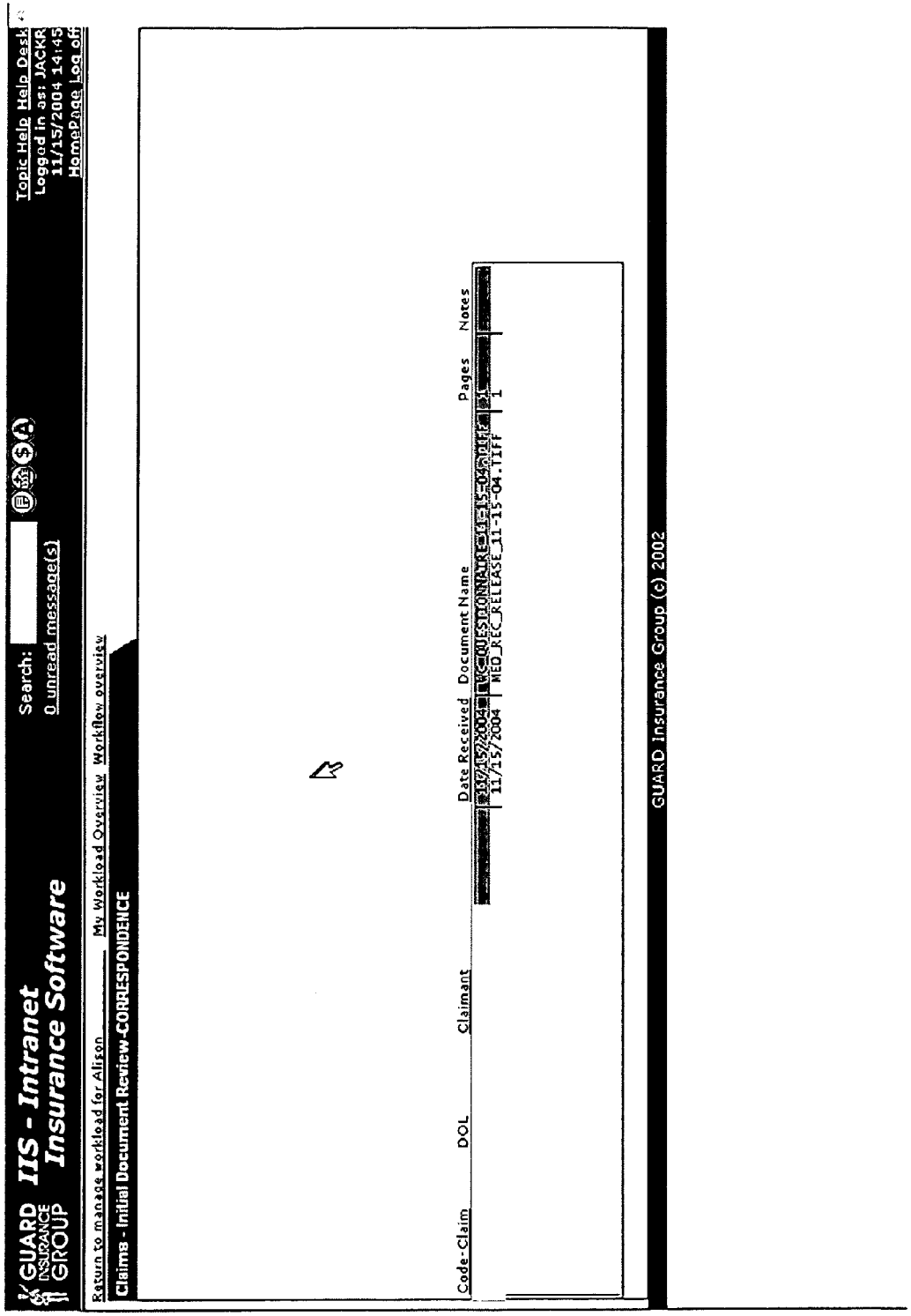
Figure 14:
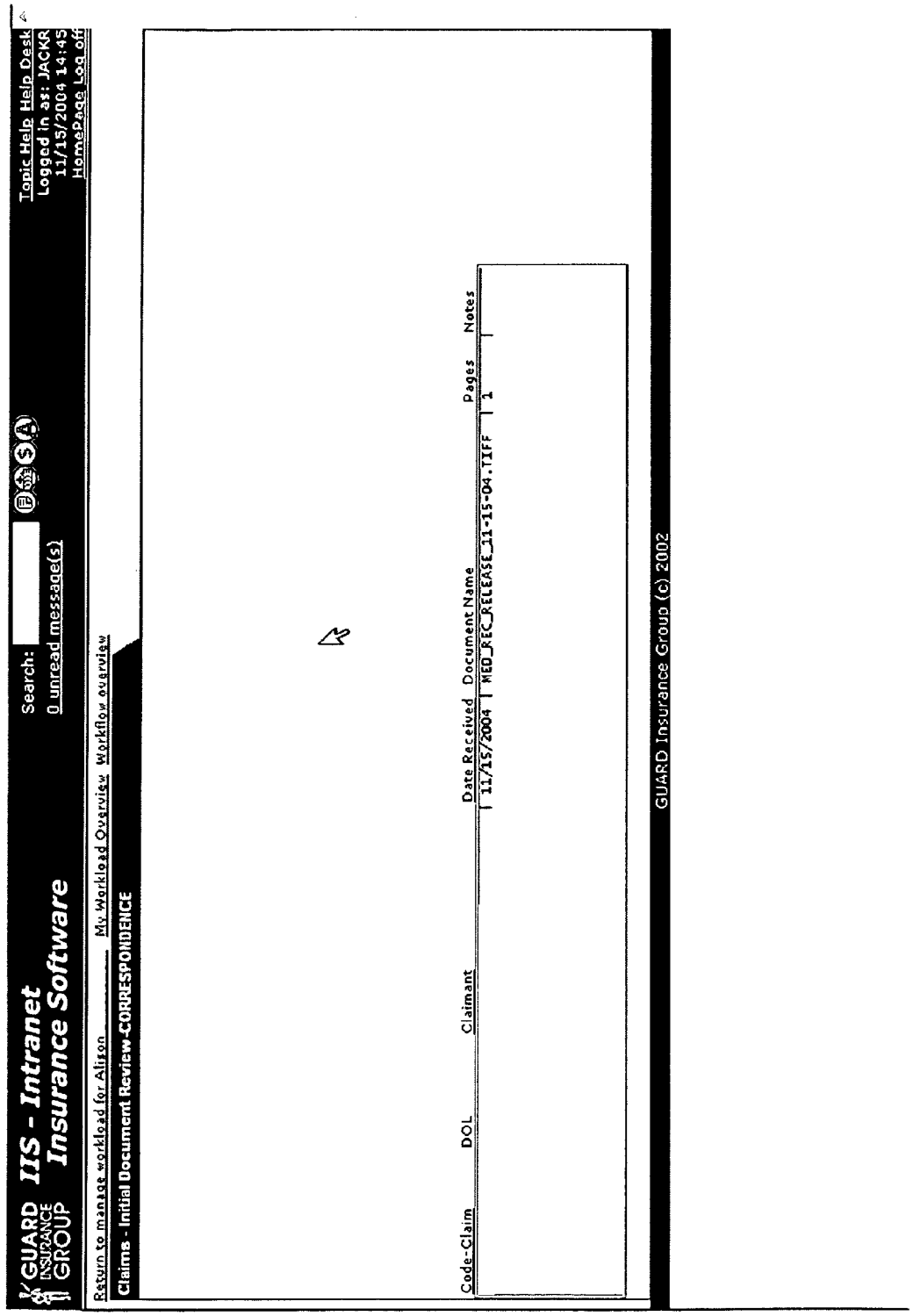
Figure 15:
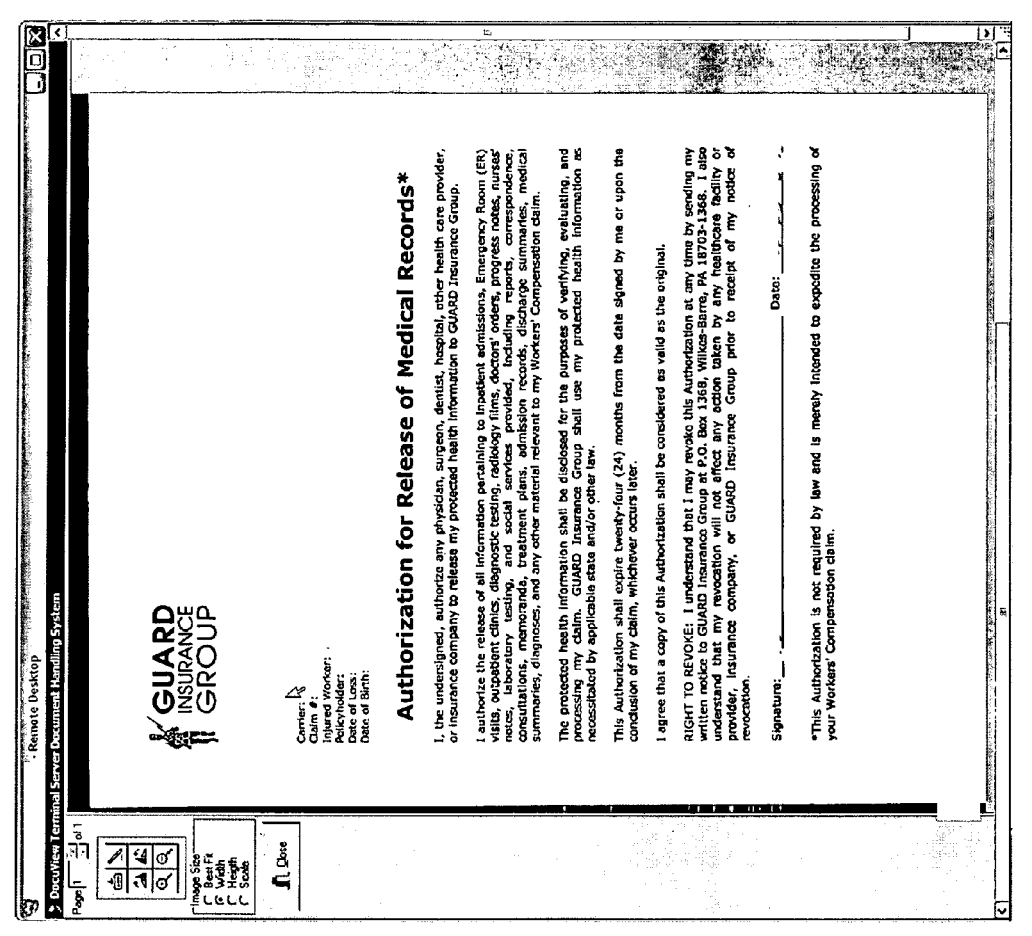

FIG. 8 illustrates a sample screenshot after an authorized user logs into his/her account via the login of FIG. 5. In this example, the user clicks on "Adjustor Centre" (of FIG. 8) to view a particular workflow as shown in FIG. 9. FIG. 10 illustrates the ability to pick and view another user's "Adjustor Centre". FIG. 11 shows a sample "Adjustor Centre", wherein a user can click on various workflow items (such as entries for "Correspondence", "MedicalBillsRecords", "MedicalReports", or "StateForms"). Clicking on each of these workflow entries launches appropriate software in the session server to communicate with appropriate object server implementing the workflow entry clicked. For example, when the user clicks on the entry corresponding to item—"Correspondence" and item—"assigned to", the application shows specific correspondence items (such as the two items shown in FIG. 12-14). When the user further selects and clicks on a specific item of "Correspondence" as in FIG. 14, the client environment is changed and the change is reflected by the session server to the appropriate object server (e.g., the object server implementing the DocuView application), which responds by rendering data to the client (e.g., browser), as shown in FIG. 15.

Figure 16:
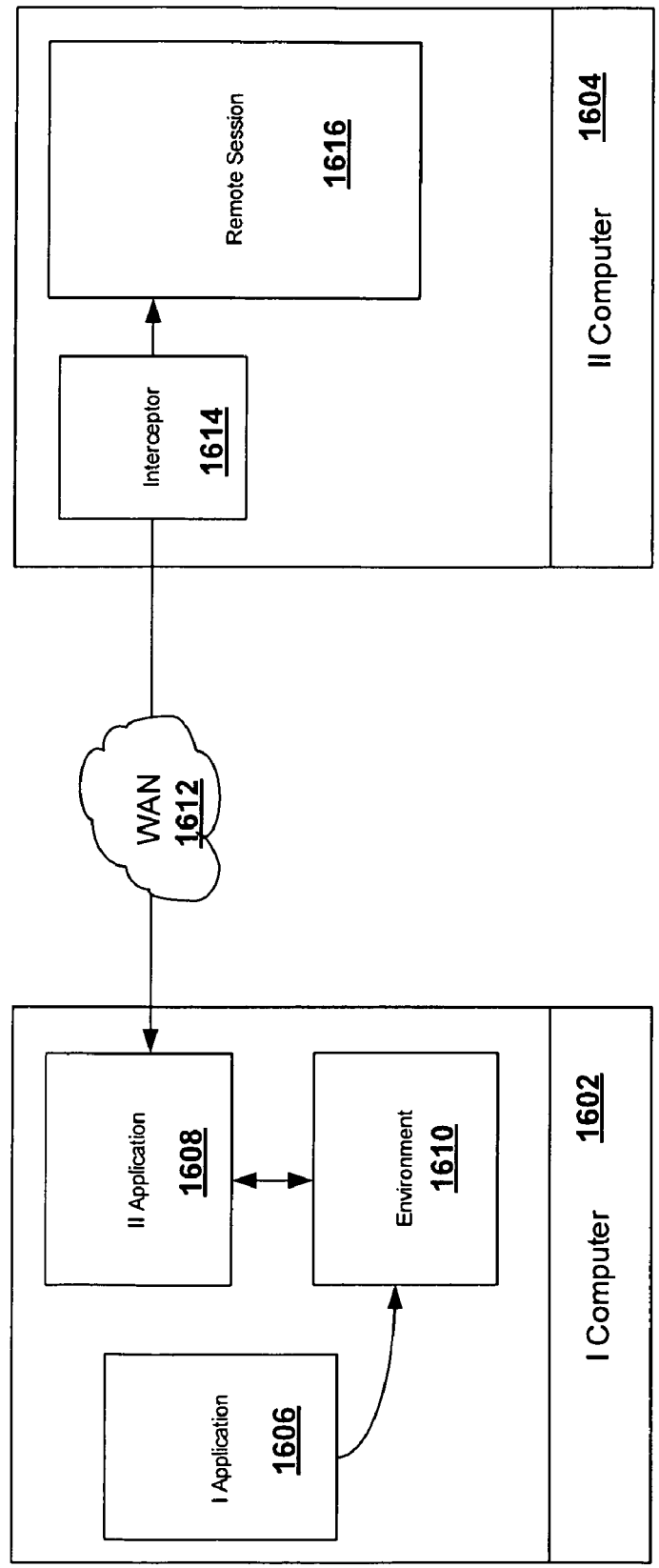
FIG. 16 illustrates one embodiment of the present invention's interceptor.

FIG. 16 illustrates an embodiment of the present invention's method as implemented in a first application associated with a first computer 1602 comprising: (a) identifying an environment 1610 associated with the first computer 1602 that is remotely controlling, via a second application 1608, a remote session 1616 on a second computer over a first network 1612 (the environment 1610 defining a plurality of parameters communicated between computers 1602 and 1604 as part of a remote session 1616, with each parameter in the plurality of parameters defining an action associated with the remote session 1616), wherein the remote controlling is performed via a bidirectional communication; and (b) the first application 1606, via a unidirectional communication with the environment 1610, modifying at least one parameter associated with the environment 1610, wherein the modified parameter is extracted by an interceptor 1614 associated with the second computer and, based on a look-up, executes a pre-defined action affecting the remote session 1616, with the pre-defined action being different than the modified parameter's associated action.

As a non-limiting example, the first computer 1602 is a client and the second computer 1604 is a terminal server, wherein the client is remotely controlling a RDP® session running on the terminal server. The environment 1610 associated with the client is defined by a plurality of parameters associated with the RDP® session, wherein the parameters can be any (but should not be limited to) the following: keyboard scan codes, cursor position, mouse position, clipboard data, screen resolution, or channel administration. Each of these parameters associated with the RDP session have an associated action.

For example, in a RDP session, when the cursor position parameters (x, y) change based on a change in the position of an input device (e.g., a mouse) associated with the client, such position changes in the client-side has an associated action of changing the mouse position in the remote session 1615 running on the terminal server. As another example, in a RDP session, when a key is depressed in an input device (e.g., a keyboard) associated with the client, such a depression of a key at a client has an associated action of inputting the value of the depressed key in the remote session 1615 running on the terminal server. As yet another example, when the second application sets the resolution of the remote session to 1024× 768, the value of '1024×768' is set in the client environment which causes the remote session running at the terminal server to be rendered at the resolution of 1024×768.

In this non-limiting example, the first application unidirectionally modifies one of the parameters associated with the environment 1610 (it is important to note that the change is propagated in a unidirectional manner as the first application 1606 does not wait for a feedback or acknowledgement). For example, the first application 1606 changes the value of the cursor position to (−4, 20) in environment 1610. Interceptor 1614 is aware of the change in the cursor position. Interceptor 1614 has access to a stored table that can be looked up for determining what pre-defined action needs to be executed that corresponds to the cursor position value of (−4, 20). The stored table has a listing of parameter values and associated actions that need to be executed. A simple non-limiting example of the stored table is provided below:

| Parameter | Current Value | Associated Action | Modified Value | Pre-Defined Action |
|---|---|---|---|---|
| Cursor Position | (5, 20) | Place cursor position at x = 5, y = 20 | (−4, 20) | Open desktop editor in remote session |
| Cursor Position | (5, 20) | Place cursor position at x = 5, y = 20 | (−5, 20) | Open email application in remote session |
| Screen Resolution | 1024 × 768 | Set current remote session resolution to 1024 × 768 | 1024 × 766 | Print currently open file in remote session |
| Clipboard Data | Value of clipboard | Post value in clipboard into application requesting a paste operation. | Clipboard modified with pasted value changed of "POST(X)" | Enter value of X in current field of application in remote session and run a script. |

Although the above-mentioned example illustrates changing the value of the cursor position to an illegal value of −4, it should be noted that the value does not have to be changed to an illegal value as the table can be updated to execute a pre-defined action for a legal value.

Another non-limiting example involved the modification of the clipboard data. The first application unidirectionally modifies the clipboard data (it is important to note that the change is propagated in a unidirectional manner as the first application 1606 does not wait for a feedback or acknowledgement) such that the clipboard has a value of "POST(X)". This value is reflected at the remote session and the Interceptor 1614 has access to a stored table that can be looked up for determining what pre-defined action needs to be executed that corresponds to the clipboard value of "POST(X)". The pre-defined action, which is different than just a paste operation of the value, could be the input of the value of X into a script that is executed. It should be noted that if there is already a string or value in the clipboard (for example, a value that was copied by the user of first computer 1602), the present invention can temporarily store the clipboard value, modify the clipboard with the new value, execute the pre-defined action corresponding to the modified value, and then revert the clipboard back to the original state of having the temporarily stored value.

The unidirectional nature of parameter modification, where no feedback or acknowledgement is received by the first application 1606 provides for a robust operation as the first application 1606 need not be programmed to account for any network and/or firewall paths that might have to be accounted for during the proper return of an acknowledgement message.

Network 1612 can be any of, or a combination of, the following: local area network (LAN), wide area network (WAN), a wireless local area network (WLAN), wireless wide area network (WWAN), a cellular network, or the Internet.

The present invention, in another embodiment, provides for a method, as implemented in an interceptor associated with a second computer 1604, comprising: (a) monitoring an environment 1610 associated with a first computer 1602 (the environment defining a plurality of parameters communicated between the first and second computers as part of a remote session, with each parameter defining an action associated with the remote session), wherein the first computer 1602, via a bi-directional communication, remotely controls a remote session on the second computer 1604 via a second application 1608, the remote controlling performed over a first network 1612, and the environment 1610 being bi-directionally accessible by the second application 1608 and unidirectionally accessible by a first application 1606 associated with the first computer 1602; and (b) intercepting incoming traffic associated with said environment 1610 from the first computer 1602, and upon detecting a parameter modified by the first application 1606, extracting the modified parameter, wherein the pre-defined action is different than the modified parameter's associated action; (c) looking-up (e.g., based on a looking up a table) at least one pre-defined action associated with the modified parameter; and (d) executing the at least one pre-defined action, wherein the execution affects the remote session.

The present invention, in yet another embodiment, provides for a method as implemented in a first application associated 1606 with a first computer 1602 comprising: identifying an environment 1610 associated with said first computer 1602 (wherein the environment 1610 defines a plurality of parameters communicated between computers 1602 and 1604 as part of a remote session, with each parameter having a value picked from at least one valid range of values), wherein the first computer 1602 remotely controlling, via a second application 1608, a remote session on a second computer 1604 over a first network, with the remote controlling being performed via a bidirectional communication, and (b) the first application 1606, via a unidirectional communication with the environment 1610, modifying at least one parameter associated with the environment 1610, the modification comprising changing the value of at least one parameter to be outside its range of valid values, wherein the modified parameter is extracted by an interceptor 1614 associated with the second computer 1604, which, based on a look-up, executes a pre-defined action affecting the remote session.

Figure 17:
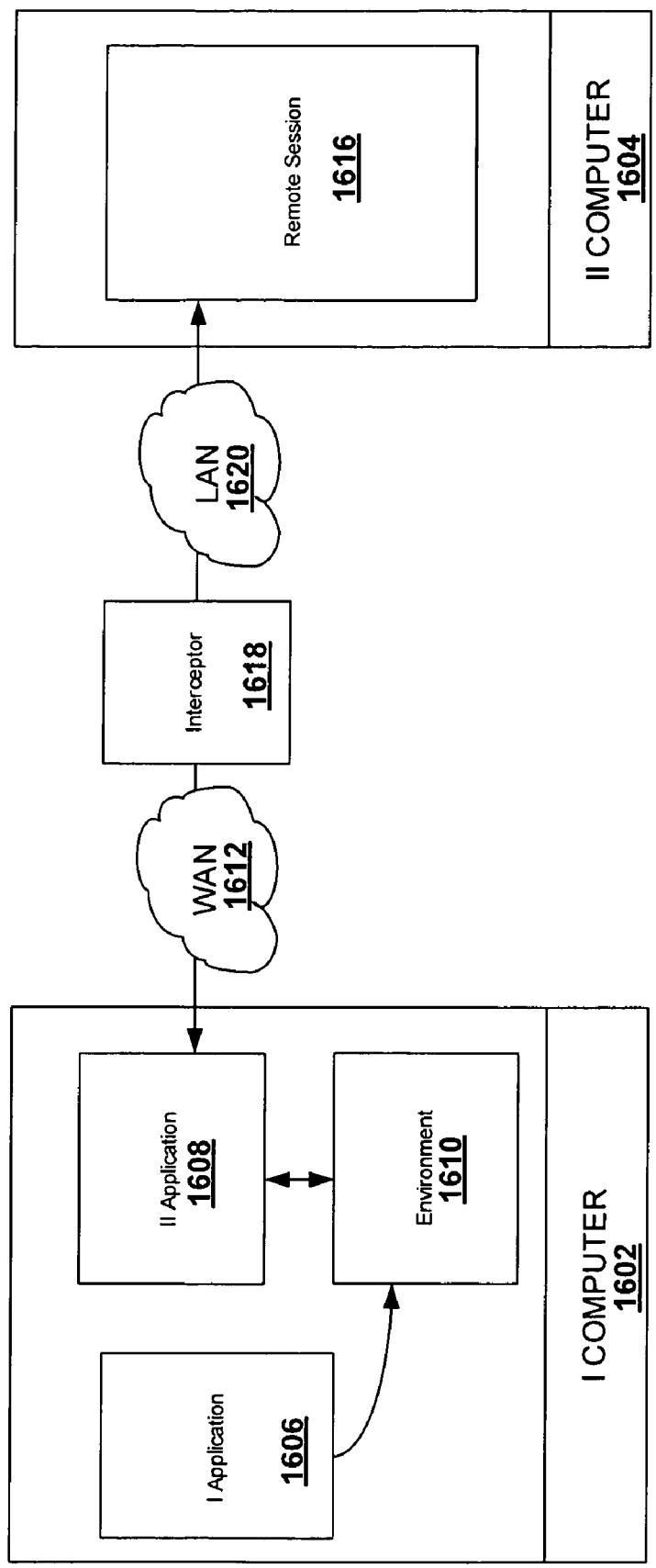
FIG. 17 illustrates another embodiment of the present invention's interceptor.

Although the interceptor has been described in the above-mentioned description as being associated with the second computer 1604, it should be noted that the specific location and implementation of the interceptor 1614 is a matter of choice. For example, FIG. 17 illustrates that the interceptor 1614 can be implemented independent of the second computer 1604. In one embodiment, the interceptor 1618 is independently located behind a local area network (LAN) 1620. In another embodiment, interceptor 1618 is implemented as part of a router or switch (not shown).

Additionally, the present invention provides for an article of manufacture comprising computer readable program code contained within implementing one or more modules to affect a novel communication method. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are: (a) a first application module to be deployed on a first computer, wherein the first computer remotely and bidirectionally communicates and controls a remote session implemented on a second computer, wherein the first application unidirectionally modifies at least one parameter associated with an environment associated with the first computer, wherein the environment defines a plurality of parameters communicated between the first and second computer as part of the remote session, where each parameter defines an action associated with said remote session; and (b) a second application module to be deployed in the second computer running the remote session, wherein the second application module intercepts communication data from the first computer, and upon detecting a parameter modified by the first application module, extracts the modified parameter, looks up at least one instruction associated with the modified parameter, and executes the pre-defined action, wherein the execution affects the remote session, with the pre-defined action being different than the modified parameter's associated action

CONCLUSION

A system and method has been shown in the above embodiments for the effective implementation of a remote communication system and method implementing an interceptor in a network router or switch. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of remote session programming.

The invention claimed is:

1. A method as implemented in a router comprising:
    extracting a modified parameter associated with an environment of an electronic device, said electronic device remotely controlling, via a second application, a remote session on a remote computer over a first network, said remote controlling performed via a bidirectional communication, and said environment defining a plurality of parameters communicated between said electronic device and remote computer as part of said remote session, each parameter in said plurality of parameters defining an action associated with said remote session, wherein said modified parameter is modified by a first application running in said electronic device, via a unidirectional communication with said environment;
    looking up a pre-defined action corresponding to said extracted modified parameter; and
    executing said pre-defined action to affect said remote session, said pre-defined action different than said modified parameter's associated action.

2. The method of claim 1, wherein said modified parameter involves modification of any of the following: keyboard scan codes, cursor position, mouse position, clipboard data, screen resolution, or channel administration.

3. The method of claim 1, wherein said first application is any of the following: web application, office productivity application, or a mail client.

4. The method of claim 1, wherein said modified parameter contains an illegal value with respect to said remote session.

5. The method of claim 1, wherein said electronic device is one of a computer or computer based device.

6. A method as implemented in a switch comprising:
    extracting a modified parameter associated with an environment of an electronic device, said electronic device remotely controlling, via a second application, a remote session on a remote computer over a first network, said remote controlling performed via a bidirectional communication, and said environment defining a plurality of parameters communicated between said electronic device and remote computer as part of said remote session, each parameter in said plurality of parameters defining an action associated with said remote session, wherein said modified parameter is modified by a first application running in said electronic device, via a unidirectional communication with said environment;
    looking up a pre-defined action corresponding to said extracted modified parameter; and
    executing said pre-defined action to affect said remote session, said pre-defined action different than said modified parameter's associated action.

7. The method of claim 6, wherein said modified parameter involves modification of any of the following: keyboard scan codes, cursor position, mouse position, clipboard data, screen resolution, or channel administration.

8. The method of claim 6, wherein said first application is any of the following: web application, office productivity application, or a mail client.

9. The method of claim 6, wherein said modified parameter contains an illegal value with respect to said remote session.

10. The method of claim 6, wherein said electronic device is one of a computer or computer based device.

11. A non-transitory article of manufacture comprising:
    computer readable program code implementing an interceptor module to be deployed in a computer networking element, said interceptor module extracting a modified parameter associated with an environment of an electronic device, said electronic device remotely controlling, via a second application, a remote session on a remote computer over a first network, said remote controlling performed via a bidirectional communication, and said environment defining a plurality of parameters communicated between said electronic device and remote computer as part of said remote session, each parameter in said plurality of parameters defining an action associated with said remote session, wherein said modified parameter is modified by a first application running in said electronic device, via a unidirectional communication with said environment;
    computer readable program code allowing said interceptor module to look up a pre-defined action corresponding to said extracted modified parameter; and
    computer readable program code allowing said interceptor module to execute said pre-defined action to affect said remote session, said pre-defined action different than said modified parameter's associated action.

12. The article of manufacture of claim 11, wherein said computer networking element is a router or a switch.

13. The article of manufacture of claim 11, wherein said modified parameter involves modification of any of the following: keyboard scan codes, cursor position, mouse position, clipboard data, screen resolution, or channel administration.

14. The article of manufacture of claim 11, wherein said modified parameter contains an illegal value with respect to said remote session.

15. The article of manufacture of claim 11, wherein said first application is any of the following: web application, office productivity application, or a mail client.

16. The article of manufacture of claim 11, wherein said electronic device is one of a computer or computer based device.

17. A method as implemented in a network device comprising:
    said network device extracting a modified parameter associated with an environment of an electronic device, said electronic device remotely controlling, via a second application, a remote session on a remote computer over a first network, said remote controlling performed via a bidirectional communication, and said environment defining a plurality of parameters communicated between said electronic device and remote computer as part of said remote session, each parameter in said plurality of parameters defining an action associated with said remote session, wherein said modified parameter is modified by a first application running in said electronic device, via a unidirectional communication with said environment;

said network device looking up a pre-defined action corresponding to said extracted modified parameter; and said network device executing said pre-defined action to affect said remote session, said pre-defined action different than said modified parameter's associated action said network device being any of the following: a router, a switch, a hub, a repeater, a network interface card, or a multilayer switch.

18. The method of claim 17, wherein said modified parameter involves modification of any of the following: keyboard scan codes, cursor position, mouse position, clipboard data, screen resolution, or channel administration.

19. The method of claim 17, wherein said first application is any of the following: web application, office productivity application, or a mail client.

20. The method of claim 17, wherein said modified parameter contains an illegal value with respect to said remote session.

21. The method of claim 17, wherein said electronic device is one of a computer or computer based device.

* * * * *